(12) United States Patent
Puppi et al.

(10) Patent No.: US 11,780,276 B2
(45) Date of Patent: Oct. 10, 2023

(54) TYRE COMPRISING MONITORING DEVICE WITH A FLEXIBLE SUPPORT

(71) Applicant: Pirelli Tyre S.p.A., Milan (IT)

(72) Inventors: Cristiano Puppi, Milan (IT); Ivan Gildo Boscaino, Milan (IT); Andrea Natta, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 296 days.

(21) Appl. No.: 17/261,402

(22) PCT Filed: Jul. 25, 2019

(86) PCT No.: PCT/IT2019/050175
§ 371 (c)(1),
(2) Date: Jan. 19, 2021

(87) PCT Pub. No.: WO2020/026283
PCT Pub. Date: Feb. 6, 2020

(65) Prior Publication Data
US 2021/0339584 A1   Nov. 4, 2021

(30) Foreign Application Priority Data

Aug. 2, 2018 (IT) .......................... 102018000007769
Dec. 4, 2018 (IT) .......................... 102018000010794
Dec. 4, 2018 (IT) .......................... 102018000010795

(51) Int. Cl.
*B60C 23/04* (2006.01)

(52) U.S. Cl.
CPC ........ *B60C 23/041* (2013.01); *B60C 23/0493* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 4,862,486 A   8/1989  Wing et al.
5,749,984 A   5/1998  Frey et al.
(Continued)

FOREIGN PATENT DOCUMENTS

CN   1714005 A   12/2005
CN   1845831 A   10/2006
(Continued)

OTHER PUBLICATIONS

Notice of Allowance issued by the China National Intellectual Property Administration dated Jul. 14, 2022, in corresponding Application No. CN 201980051424.1 (6 pages).
(Continued)

*Primary Examiner* — Andre J Allen
(74) *Attorney, Agent, or Firm* — Finnegan, Henderson, Farabow, Garrett & Dunner, L.L.P.

(57) ABSTRACT

The present disclosure is directed to a tyre with a monitoring device fixed on an inner surface at a crown portion, wherein the monitoring device includes an electronic unit and an electric power supplier, wherein the electronic unit includes a sensor for detecting at least one of temperature, pressure, acceleration, deformation; a processing unit; a transceiver, wherein the monitoring device includes a flexible support on which the electronic unit and the electric energy supplier are fixed, and wherein an acute angle (A) formed between a main development direction (L) of the flexible support and a direction of intersection of the equatorial plane of the tyre with the inner surface of the tyre is greater than or equal to 20° and lower than or equal to 70°.

15 Claims, 3 Drawing Sheets

(58) Field of Classification Search
CPC . B60C 23/0433; B60C 23/0493; B60C 19/00; B60C 23/04; B60C 23/041; B60C 23/0462; B60C 23/0411; B60C 23/20; B60C 23/0444; B60C 23/0479; B60C 11/24; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06

USPC .............................................. 73/146–146.8

See application file for complete search history.

(56) References Cited

U.S. PATENT DOCUMENTS

| | | | |
|---|---|---|---|
| 5,960,844 | A | 10/1999 | Hamaya |
| 5,977,870 | A | 11/1999 | Rensel et al. |
| 9,796,219 | B2 | 10/2017 | Chong et al. |
| 2004/0060629 | A1 | 4/2004 | Willard, Jr. et al. |
| 2005/0110277 | A1 | 5/2005 | Adamson et al. |
| 2006/0164250 | A1 | 7/2006 | Kawai |
| 2006/0243043 | A1* | 11/2006 | Breed ............... B60C 23/041 73/146 |
| 2007/0013503 | A1 | 1/2007 | Chien et al. |
| 2007/0227644 | A1 | 10/2007 | Fagot-Revurat et al. |
| 2008/0122707 | A1 | 5/2008 | Fagot-Revurat |

(56) References Cited

U.S. PATENT DOCUMENTS

| | | |
|---|---|---|
| 2008/0303634 A1 | 12/2008 | Toyofuku et al. |
| 2009/0115591 A1 | 5/2009 | Mancosu et al. |
| 2009/0134710 A1 | 5/2009 | Tyndall et al. |
| 2009/0018831 A1 | 7/2009 | Mancosu et al. |
| 2009/0183562 A1 | 7/2009 | Brusarosco et al. |
| 2009/0218459 A1 | 9/2009 | Durif et al. |
| 2010/0007477 A1 | 1/2010 | Wilson et al. |
| 2010/0032066 A1 | 2/2010 | Nakao et al. |
| 2010/0097662 A1 | 4/2010 | Churilla et al. |
| 2010/0271191 A1 | 10/2010 | de Graff et al. |
| 2011/0315292 A1 | 12/2011 | Gougnaud |
| 2014/0118134 A1 | 5/2014 | Won |
| 2014/0352420 A1 | 12/2014 | Brusarosco et al. |
| 2015/0097662 A1 | 4/2015 | Yu et al. |
| 2015/0273956 A1 | 10/2015 | Biegner et al. |
| 2016/0317068 A1 | 11/2016 | Pepin et al. |
| 2017/0001483 A1 | 1/2017 | Sabatini et al. |
| 2017/0250633 A1 | 8/2017 | Moiraghi et al. |
| 2020/0300613 A1 * | 9/2020 | Bogdanovich ............ G01B 7/18 |
| 2021/0276374 A1 * | 9/2021 | Puppi .................... B60C 23/041 |
| 2022/0016944 A1 * | 1/2022 | Puppi .................. B60C 23/0493 |

FOREIGN PATENT DOCUMENTS

| | | |
|---|---|---|
| CN | 1953881 A | 4/2007 |
| CN | 1982098 A | 6/2007 |
| CN | 101068691 A | 11/2007 |
| CN | 101193764 A | 6/2008 |
| CN | 101460320 A | 6/2009 |
| CN | 101553373 A | 10/2009 |
| CN | 101691103 A | 4/2010 |
| CN | 102271932 A | 12/2011 |
| CN | 203254901 U | 10/2013 |
| CN | 104024005 A | 9/2014 |
| CN | 105043428 A | 11/2015 |
| CN | 106163835 A | 11/2016 |
| CN | 107533982 A | 1/2018 |
| DE | 195 32 914 A1 | 3/1997 |
| DE | 102005016354 A1 | 10/2006 |
| DE | 102005051136 A1 | 5/2007 |
| DE | 102007014097 A1 | 9/2008 |
| DE | 10 2012 007 071 A1 | 10/2013 |
| FR | 2894519 A1 | 6/2007 |
| JP | 2006-64565 A | 3/2006 |
| JP | 2012-108152 A | 6/2012 |
| RU | 2659120 C1 | 6/2018 |
| WO | WO 2004/110794 A1 | 12/2004 |
| WO | WO 2005/113262 A1 | 12/2005 |
| WO | WO 2007/048621 A1 | 5/2007 |
| WO | WO 2007/121768 A1 | 11/2007 |
| WO | WO 2011/051800 A1 | 5/2011 |
| WO | WO 2013/098711 A1 | 7/2013 |
| WO | WO 2013/098712 A1 | 7/2013 |
| WO | WO 2016/042580 A1 | 3/2016 |
| WO | WO 2018/065846 A1 | 4/2018 |
| WO | WO-2020129104 A1 * | 6/2020 ......... B60C 23/0488 |

OTHER PUBLICATIONS

Notification of Second Office Action issued by the China National Intellectual Property Administration dated Aug. 3, 2022, in corresponding Application No. CN 201980051436.4 (8 pages).

International Search Report form the European Patent Office in corresponding International Application No. PCT/IT2019/050175 dated Nov. 28, 2019.

Written Opinion of the International Searching Authority from the European Patent Office in corresponding International Application No. PCT/IT2019/050175 dated Nov. 28, 2019.

Decision to Grant dated Oct. 26, 2021, from Russian Federal Service for Intellectual Property, in counterpart Russian Application No. 2021103559.

Notification of the First Office Action issued by the China National Intellectual Property Administration dated Sep. 2, 2022, in corresponding Application No. CN 201980051418.6 (7 pages).

* cited by examiner

TYRE COMPRISING MONITORING DEVICE WITH A FLEXIBLE SUPPORT

This application is a national stage entry application under 35 U.S.C. § 371 based on International Application No. PCT/IT2019/050175, filed Jul. 25, 2019 and claims priority to Italian Patent Application No. 102018000007769, filed Aug. 2, 2018, Italian Patent Application No. 102018000010794, filed Dec. 4, 2018, and Italian Patent Application No. 102018000010795, filed Dec. 4, 2018; the contents of each application is incorporated herein by reference.

TECHNICAL FIELD OF THE INVENTION

The present invention relates to a tyre comprising a monitoring device, for example suitable for monitoring at least one physical quantity among temperature, pressure, deformation, acceleration.

STATE OF THE ART

Typically a tyre has a substantially toroidal structure around an axis of rotation of the same during operation, and it has an equatorial plane perpendicular to the axis of rotation, said equatorial plane being typically a plane of (substantial) geometric symmetry (e.g. ignoring any minor asymmetries, such as the tread design and/or the writing on the sides and/or structure or profile asymmetries).

With "inner cavity" it is meant the space delimited by the inner surface of tyre and by surface of the rim facing towards the inner surface of the tyre, when mounted.

With "crown portion" it is meant the portion of tyre placed at the tread band.

The terms "radial" and "axial" are used with reference respectively to a perpendicular direction and to parallel direction to the rotation axis of the tyre.

The term "tangential" is used with reference to a direction generally faced according to the rolling direction of the tyre, perpendicular to both the radial direction and the axial direction.

With "footprint" it is meant the portion of outer surface of the tread band which, during the rolling of the tyre mounted and subjected to a load (for example due to effect of the mounting under a vehicle), at each instant is in contact with the rolling surface.

The footprint typically has a substantially null curvature (or substantially infinite curvature radius), or in each case it substantially assumes the conformation of the rolling surface.

With 'electric power supplier' it is meant a component structured to supply electric power to the electronic unit of the monitoring device. The supplier can consist in one or more electric energy accumulators, wherein the power to be supplied is pre-accumulated (e.g. battery or capacitor), or it can contain, in combination or not with one or more accumulators, a generator and/or receiver in situ of electric power suitable for directly supplying the electronic unit and/or for re-charging the accumulators (for example a power recovery device or 'energy scavenging or harvesting' device, or an electromagnetic induction receiver).

There have been proposed tyres for vehicles comprising monitoring devices of one or more physical quantities arranged in the inner cavity of the tyre, for example as described in US 2014/0118134 A1; U.S. Pat. Nos. 4,862,486; 5,749,984; 5,960,844; 5,977,870; US 2008/0303634 A1; US 2009/0134710 A1; US 2010/0007477 A1, DE102012007071 A1, WO2007/121768 A1, WO2007/048621 A1, WO2013/098711 A1, WO2013/098712 A1, WO2018/065846 A1, US 2007/0013503 A1, US 2010/0271191 A1, US 2015/0097662 A1.

SUMMARY OF THE INVENTION

In the context of tyres comprising monitoring devices arranged in the inner cavity of the tyre, the Applicant has made the following considerations.

It is preferable to detect the desired physical quantity, in particular the temperature, the deformation or the acceleration, directly onto the, or near to the, inner surface of the tyre at its crown portion. For example, it is preferable to obtain the temperature near to the inner surface of the crown portion, since in this way it is substantially obtained the actual temperature of the tyre material in the area in which the greatest stresses develop which tend to heat the tyre during the rolling. On the contrary, the temperature for example near to the rim or the temperature of the fluid present in the inner cavity can be very different from the temperature of the inner surface of the crown portion. Moreover, when the temperature is obtained, for example near to the rim or the inflation valve, the data measured is influenced by the temperature of the environment outside the wheel due to the heat conduction and/or the presence of external heat sources such as air flows from the radiators or the brake discs.

In the case of the acceleration or of the deformation, it is preferable a direct measurement of at least one of the radial, tangential and axial components of the acceleration or of the deformation undergone by an arbitrary point located onto the inner surface of the crown which is subjected to stress and deformation due to the cycle of entry and exit from the footprint, or more generally from the interaction between the tyre and the rolling surface. In this way it is possible to obtain from the detected acceleration or deformation signal information on the status and/or instantaneous behaviour of the tyre during use (e.g. dimensions of the footprint, wear, hydroplaning, slippage, etc.). Therefore it is desirable to apply the acceleration and/or deformation sensor, or the sensors, to a point close to where the greatest stresses are generated, i.e. near to the contact between the tyre and the rolling surface, as typically a point on the inner surface of the crown portion, for example placed in correspondence with the central rib arranged in the axially central area of the tread, or in any case in a point on the inner surface of the crown portion corresponding to the most stressed area (both mechanically and thermally) of the tread during the tyre rolling.

For the realization of the monitoring device a PCB ('Printed Circuit Board') technology is typically used, based on a rigid support, on which the circuit tracks (electrically conductive metal tracks) are printed and the electronic components are fixed through the respective electrical connections (e.g. "pin") by welding and, possibly, adhesives. In this way the electrical and mechanical connections between the various electrical and electronic components and the rigid support are realized. Typically, the rigid support (PCB) comprises one or more layers of a base material, such as glass fibre, impregnated with a resin (e.g. epoxy).

Furthermore, for the operation of the monitoring device it is usual to provide an electric energy accumulator/generator. For example, typically a battery (e.g. coin cell) comprising a metal capsule is used. This electric energy accumulator/generator typically has a significant weight. For example, a non-rechargeable coin cell battery of the CR2032 type, with an electric charge of about 200-250 mAh, has a mass of about 3 g.

The prevalent tendency is to make the overall monitoring device as compact as possible. For example, a used solution envisages to superimpose on each other, appropriately connected, an accumulator and the PCB with all the electronic components fixed on it, and to encapsulate the whole with an encapsulating material (e.g. polymeric resin), possibly inside a rigid containment body. Furthermore, a housing can be provided (for example made of elastomeric material) to couple the device to the surface of the tyre. The coupling can be made by means of an attachment piece to the surface of the tyre and/or one or more adhesives. The set of these structures (containment body, encapsulant, housing, adhesive/s) entails a further increase in weight, for a total overall weight of the entire monitoring device which can reach 8-15 g, almost all located in a small area, equal to the plan area of the container (for example, inscribed in a circle with diameter of 18-30 mm). The Applicant, in conducting tests at very high tyre rotation speeds (corresponding to extreme linear speeds of a corresponding vehicle, for example over 300 km/h) with a monitoring device thus formed and fixed on the inner surface of the crown portion of the tyre in the axially central area, has verified that the location of the aforesaid overall mass generates very intense stresses (in particular radial and tangential stresses).

In fact, in the areas of entry and exit from the footprint, due to the corresponding deformation undergone by the tyre, the radial acceleration is greater than in the areas outside the footprint. From experimental surveys, carried out by the Applicant at different speeds, the maximum acceleration at the entrance and exit of the footprint is about 1.5 times the radial acceleration outside the footprint. Moreover, in the footprint area, while the radial acceleration nullifies, a tangential acceleration appears which follows, along the footprint, a pattern similar to a sinusoid, whose amplitude has been experimentally determined by the Applicant equal to about the half of the radial acceleration at the footprint entry/exit.

According to the Applicant, the acceleration with its rapid and intense variation on high-frequency cycles generates significant cyclic stresses, in radial direction (such as a 'hammering') and in tangential direction (shear), caused by the monitoring device on the tyre structures and/or vice-versa. At the aforementioned extreme speeds, these stresses have as direct consequence a significant and localized overheating of the monitoring device and/or of the tyre at the point of application of the monitoring device. Said overheating can significantly distort the reading of the correct operating temperature of the tyre by the monitoring device. Furthermore, said overheating and said mechanical stress and/or the combination of the two effects can lead to a damaging of the monitoring device (or its components, for example of the accumulator), relatively to its structural and/or functional integrity, and/or to its coupling with the inner surface of the tyre (for example decomposition and/or detachment of the adhesive for applying the device to the inner surface). In more serious cases, said overheating and said mechanical stress and/or the combination of the two effects can lead to the loss of structural integrity of the crown portion of the tyre, even up to the formation of holes (so-called "blisters") at the tread band, caused by the localized decomposition of the tyre compound which detaches due to the rotational movement of the tyre, and/or to the delamination of the tread To overcome these drawbacks, the Applicant has devised a monitoring device in which the electronic unit and the electric power supplier are fixed on a flexible support. According to the Applicant, this solution causes the overall mass of the monitoring device to be reduced, due to the elimination of a component of significant mass such as the PCB, as well as of the encapsulating material. The flexible support allows the monitoring device to adapt to the deformation of the crown portion during rolling, in particular at the footprint, and it allows to distribute the stresses on a wider surface.

In particular, in the monitoring device at least part of the power supplier and the electronic unit are separately fixed to the flexible support, or at least two accumulators belonging to the power supplier are separately fixed to the flexible support. In other words, at least part (preferably the totality) of the electronic unit and of the power supplier, and/or at least two accumulators, are not radially superimposed to each other. In this way the overall mass of the monitoring device is divided into at least two parts of non-negligible mass with respect to the overall mass of the device. It is thus reduced the mass which insist, with the consequent aforesaid hammering and shearing stress phenomenon, on a respective single localized crown portion of the tyre: this entails a reduction in the consequent overheating of the crown portion and/or of the adhesive and/or of the monitoring device.

The aforesaid solution may entail, for some embodiments, that the monitoring device, and in particular the flexible support, has an elongated plan, i.e. it is characterized by a main development direction and a perpendicular direction to it of shorter length. Typically, the aforementioned two parts of non-negligible mass are arranged along this main development direction.

The Applicant has conducted an extensive experimental test campaign in which it has been varied the positioning of such an elongated monitoring device, in particular in relation to its angular orientation with respect to the equatorial plane of the tyre. In some cases the device was positioned so as to intersect the equatorial plane, in particular so that the electronic unit (and therefore the sensor) was near to the equatorial plane, and therefore to the central area (e.g. the central rib) of the tread, in order to detect the quantities of interest in the area with the greatest thermal and/or mechanical stress.

For devices of advantageously small dimensions, the Applicant has observed that in the (comparative) case in which the aforesaid main direction is parallel, or substantially parallel (e.g. it forms an acute angle within +/−10° with the equatorial plane), to the equatorial plane, the monitoring device insists substantially with the weight of all its components on the same area at the central zone of the tread. This area, already subjected to greater stresses and greater heating in the absence of the monitoring device, thus undergoes hammering and shear stress phenomena substantially added together due to the presence of the various components of the device, with a consequent further increase of the temperature and/or of the mechanical stresses and the resulting disadvantages described above.

Moreover, the Applicant has observed that in the further (comparative) case in which the aforesaid main direction is perpendicular, or substantially perpendicular, to the equatorial plane (e.g. it forms an angle within 90°+/−10° with the equatorial plane), the monitoring device, in some conditions relating to the material, to the dimensions of the support, to the test conditions, to the structure of the tyre and/or to its tread pattern, etc., undergoes a completely new and unexpected phenomenon, i.e. it presents a ripple, or curling, in the flexible support, whose through-crest-through shape develops along the main development direction. This ripple was mainly observed in a central portion of the flexible support, and with development along the whole width of the support.

According to the Applicant, without wishing to restrict to any theory, this phenomenon originates from the deformations undergone by a tyre mounted, inflated, loaded and subjected to rolling, which are reverberated on the flexible support of the monitoring device (in particular when the adhesive which fixes the device on the surface of the tyre does not flow either with respect to the tyre surface or with respect to the flexible support). The flexible support, due to its substantially axial positioning, is therefore subjected to deformation forces which produce their effects largely along the main development. Such deformation forces produce the aforesaid ripple or curling in the flexible support, and the more incompressible the support, or more in general the less compressible the support is with respect to the tyre, the bigger the ripple. The generation of such a ripple, right in the middle of the flexible support, i.e. wherein there are many electronic components and/or many electric connection circuit tracks, can lead, especially with prolonged use, to an interruption of the electric connections and/or a malfunction of the devices. Moreover, this ripple can amplify the tangential and/or radial movements of the components that are in its proximity, with an increase of the mechanical stresses and/or of the overheating.

The Applicant has therefore faced the problem of making a monitoring device of at least one physical quantity (for example temperature, and/or pressure and/or acceleration and/or deformation) to be directly applied near to the inner surface of the crown portion of a tyre, being able to avoid or to limit the localized overheating and the consequent risk of detecting an incorrect temperature value and/or of loss of structural or functional integrity of the tyre and/or of the monitoring device, including also its adhesion to the surface, even at very high rotation speeds of the tyre, and also in presence of a significant accumulation of electric power, compatible with the average life of a tyre.

The Applicant has discovered that by positioning a monitoring device, based on an elongated flexible support, in oblique manner with respect to the equatorial plane, the aforesaid rippling phenomenon and the related harmful consequences are limited or eliminated.

According to an aspect the invention relates to a tyre comprising a monitoring device fixed on an inner surface of said tyre at a crown portion of said tyre.

The monitoring device comprises an electronic unit and an electric power supplier electrically connected to said electronic unit.

The electronic unit comprises: at least one sensor for detecting at least one of the following physical quantities: temperature, pressure, acceleration, deformation; a processing unit; a transceiver.

The monitoring device further comprises a flexible support in a single body having a plan with elongated shape along a main development direction. Said electronic unit and said electric energy supplier are fixed to said flexible support.

Preferably an acute angle formed between said main development direction and a direction of intersection of an equatorial plane of the tyre with the inner surface of the tyre (or a direction parallel to the direction of intersection) is greater than or equal to 20° and lower than or equal to 70°.

With 'main development direction' it is meant the direction along which the flexible support, when undeformed, has the greater dimension.

When the flexible support is applied to the curved inner surface of the tyre, it can assume a slightly curved shape. Similarly, the intersection of the equatorial plane with the inner surface is typically curved. For the purpose of the identification of the main development direction, of the direction of intersection of the equatorial plane with the inner surface and the aforementioned angle it is considered the portion of the inner surface of the tyre around the device developed on a plane.

The positioning of the monitoring device, with elongated shape, so that the acute angle formed between the main development direction and the aforementioned direction of intersection of the equatorial plane with the surface of the tyre is greater than or equal to 20° and lower than or equal to at 70°, i.e. neither parallel nor perpendicular to the equatorial plane but oblique, allows to arrange the masses of the main functional units of the device (e.g. the power supplier, the accumulator (s), the electronic unit, etc.) so as they do not all insist on the same circumferential portion of tread (as instead would happen in the case of positioning parallel to the equatorial plane with devices of advantageously contained dimensions). The Applicant has also verified that this solution allows to greatly reduce or completely cancel the onset of the aforesaid rippling phenomenon of the flexible support which has been observed in some cases with the device perpendicularly positioned, as described above.

Without wishing to bind to any interpretative theory, according to the Applicant this is due to the fact that the oblique arrangement of the flexible support allows to "discharge" the stresses transmitted by the deformations of the tyre both along the main development direction and along the direction perpendicular to the main development. In other words, these stresses can be distributed in both the development directions of the device, without producing their effects mainly in a single direction.

The present invention can have one or more of the following preferred features.

The term 'longitudinal' (and similar), when referred to the monitoring device, refers to a direction generally parallel to the main development direction.

Preferably said acute angle is greater than or equal to 25°, more preferably greater than or equal to 30°, and/or lower than or equal to 65°, more preferably lower than or equal to 60°.

Preferably a length of the flexible support along said main development direction is greater than or equal to 70 mm, more preferably greater than or equal to 80 mm, and/or lower than or equal to 140 mm, more preferably lower than or equal to 130 mm. The Applicant has verified that these lengths are sufficient to allow to effectively distribute the masses of the electric and electronic components, without making the overall device excessively long and/or cumbersome.

Preferably an aspect ratio between a length of the flexible support along said main development direction and a width along a direction perpendicular to the main development direction is greater than or equal to 1.5, more preferably greater than or equal to 2, even more preferably greater than or equal to 2.5, and/or lower than or equal to 6, more preferably lower than or equal to 5. These values of the aspect ratio offer a sufficient surface for an efficient distribution of the masses.

Preferably said electric power supplier comprises at least one electric energy accumulator electrically connected to said electronic unit for supplying said electronic unit, said accumulator being fixed on said flexible support.

Preferably said electric power supplier (more preferably said at least one accumulator) and said electronic unit are arranged along said main development direction (in other words the main development direction passes for both the electronic unit and the power supplier, for example for the respective centre of mass). In this way it is possible to place the supplier and the electronic unit at a mutual distance, exploiting the elongated shape of the flexible support, to reduce their mechanical and/or thermal interaction.

Preferably said electric power supplier comprises a plurality of electric energy accumulators, each accumulator being electrically connected to said electronic unit and suitable for supplying said electronic unit, wherein each of said accumulators is fixed on said flexible support.

The presence of a plurality of electric energy accumulators distinct from each other and singularly fixed onto the flexible support causes the accumulators not to be—not even partially—radially superimposed to each other. Moreover, they are also not radially superimposed to the electronic unit—not even partially—given that the electronic unit is fixed onto the flexible support. In this way the total mass of the power supplier is divided into at least two parts (the accumulators), each part having a non-negligible mass with respect to the overall mass of the device. It is thus reduced the mass which insists, with the consequent aforesaid hammering and shearing stress phenomenon, on a respective single localized crown portion of the tyre: this entails a reduction in the consequent overheating of the crown portion and/or of the adhesive and/or of the monitoring device.

Preferably said accumulators are arranged along said main development direction (in other words the main development direction passes through each accumulator, for example through the respective centre of mass). In this way it is possible to place the accumulators at a mutual distance, exploiting the elongated shape of the flexible support, to reduce their mechanical and/or thermal interaction.

Preferably said plurality of accumulators comprises a first and a second accumulator arranged at opposite sides of said electronic unit. By interposing the electronic unit between the two accumulators, the latter are placed at a mutual distance greater than a placement on the same side of the electronic unit, with the same overall length of the monitoring device. In this way it is avoided or further limited the aforementioned phenomenon of addition of the heating effects of the two individual accumulators, with consequent overheating (in particular at the areas most stressed in the tread of the tyre, such as for example the central rib).

Preferably said plurality of accumulators comprises two and no more than two accumulators. In this way it is limited the plan encumbrance and the complexity of the monitoring device.

Preferably said first and second accumulators are arranged at longitudinally opposite ends of the monitoring device. This shape has proved to be rational and particularly efficient in limiting the overheating and/or in guaranteeing the integrity of the monitoring device. For example, since the accumulators (i.e. the typically heavier parts of the device) are positioned in a peripheral or extreme position of the flexible support, the stress (radial and/or tangential stresses) and the relative deformations produced by the accumulators on the flexible support in the area of the circuits and of the electronic unit (located substantially in the central area of the flexible support) are limited, all to the benefit of the device functionality.

Preferably each of said accumulators is an electric battery (for example a coin cell battery), more preferably non rechargeable.

Preferably each of said accumulators has circular plan.

Preferably each of said accumulators comprises a rigid housing, for example made of metal.

Preferably each of said accumulators has a charge capacity greater than or equal to 30 mAh, more preferably greater than or equal to 80 mAh, even more preferably greater than or equal to 100 mAh.

Typically, each of said accumulators has a weight greater than or equal to 0.5 g, more preferably greater than or equal to 1 g. Preferably each of said accumulators has a weight lower than or equal to about 4 g. For uses on tyre suitable for heavy loads (such as tyre for SUV, CUV, truck, bus, etc.) batteries of greater weight, till about 7-8 g, can be used.

Preferably each of said accumulators is inscribed in a circle having diameter lower than or equal to 30 mm, more preferably lower than or equal to 25 mm, and/or circumscribed to a circle having diameter greater than or equal to 15 mm, more preferably greater than or equal to 17 mm.

These types of accumulators are able to supply sufficient energy for the operation of the device even over periods compatible with the average life of a tyre (depending on its different uses), and/or even in the presence of complex functions of the device, such as detection of different parameters such as acceleration, length and/or shape of the footprint, vertical load acting on the tyre, etc.

Preferably each of said accumulators is structured to resist to temperatures greater than or equal to 100° C., more preferably greater than or equal to 110° C. In this way the accumulators resist to the overheating temperatures of the tyres.

Typically, the monitoring device comprises an electric connection circuit for connecting the supplier/each accumulator to said electronic unit, wherein preferably said electric connection circuit comprises at least two separate electric paths (one for the connection to the positive pole and one for the connection to the negative pole of the accumulators).

Preferably said accumulators are electrically connected to said electronic unit in parallel. In this way the capacity of the accumulators is added, obtaining a significant increasing of the duration of the monitoring device and/or an increase of the detection functionality.

Preferably the electric connection circuit is fixed onto said flexible support, more preferably printed onto said flexible support with a conductive ink, even more preferably printed with serigraphic, lithographic, by ink jet, etc. technology. In one embodiment the electric connection circuit comprises copper conductive tracks, preferably obtained by chemical etching of a thin layer (e.g. few microns or few tens of microns) of copper. These technologies are particularly suitable for flexible substrates and are capable of creating conductive tracks resistant to the flexions. Preferably a distance between each pair of accumulators is greater than or equal to 40 mm, more preferably greater than or equal to 50 mm. With 'distance' it is meant the length of the shortest line on the inner surface of the tyre (in the undeformed state) joining the edges of the two considered accumulators (e.g. the edges of a housing of an accumulator). The Applicant has observed that in this case the temperature distributions (determined by the heating phenomenon due to the cyclical stresses of entry/exit from the footprint and the phenomenon of the propagation of the produced heat) individually associated with each accumulator are spatially substantially decoupled from each other, so that a localized heat build-up is avoided. In other words, the accumulators are sufficiently far apart from each other to prevent that the local heating of the individual accumulators adds up in a point, with the further advantages described above.

Preferably said distance between each pair of accumulators (14) is lower than or equal to 250 mm, more preferably lower than or equal to 200 mm, even more preferably lower than or equal to 150 mm. In this way the length of the electric connection circuit and/or the extension of the overall device is limited, and the consequent complications in terms of fabrication, coupling (bonding) with the tyre, structural resistance of the tracks, etc are reduced.

Preferably the equatorial plane of the tyre crosses said monitoring device, more preferably it crosses said electronic unit, for example at said sensor. In this way the device (preferably the sensor) is applied in a portion of the tyre subjected to the greatest stresses and—therefore—of greater interest in the case of signal measurements (e.g. accelerometers) from which information on the status and/or on the instantaneous behaviour of the tyre during the use is to be detected.

Preferably said at least one sensor is suitable for detecting at least two of the following physical quantities: temperature, pressure, acceleration, deformation, for example temperature and pressure. Even more preferably said at least one sensor is suitable for detecting at least three of, or all four, said physical quantities. Preferably said at least one sensor is suitable for detecting at least said acceleration and/or said deformation, more preferably at least a radial component and/or a tangential component of said acceleration and/or of said deformation. In this way the monitoring device provides particularly useful data for obtaining the status and/or the operation of the tyre, and/or the behaviour of the vehicle on which it is mounted.

Preferably said flexible support is fixed to the inner surface of said tyre by means of a layer of adhesive (e.g. a pressure sensitive adhesive).

Preferably said flexible support is substantially inextensible. In this way the shear stresses are distributed and/or the stresses on the tracks of the connection circuit are limited.

For the purposes of the present description and of the claims which follow, with "flexible support" it is generally meant a support made of a material (including a composite/layers material) which, if used for making a square-shaped slab on the side significantly greater than the circumferential extension of the area of entry or exit from the footprint portion of a tyre (for example a 120 mm×120 mm surface plate) and of a thickness equal to the support, allows this plate to conform—to ambient temperature—to a cylindrical surface of radius smaller than the normal curvature radius of a tyre inflated to its nominal pressure (for example a cylindrical surface of radius 200 mm, preferably 100 mm, more preferably 50) without breaking or undergoing a permanent deformation.

For the purposes of the present description and of the claims which follow, with "non extensible support" it is generally meant a support with a thickness from about 10 µm to about 400 µm, preferably from about 50 µm to about 200 µm, made of a material (including a composite/layers material) having traction elastic modulus preferably greater than 0.1 GPa, more preferably greater than 0.5 GPa at 23° C.

Preferably said flexible support (13) is a film of an elastomeric or thermoplastic material selected from the following group: nylon, PET, PEN, polyimide, EPDM, diene polymers and polyurethane resins. Paper substrates, thin sheets in epoxy resin (possibly reinforced, for example with glass fibres) or super-thin and therefore flexible sheets made of silicon (or another semiconductor) can also be used.

These flexible supports have proved to be suitable for technologies in which the electric connection circuit is printed or deposited onto the support or chemically etched, and the pre-fabricated electronic components are fixed, and electrically connected, to the electric connection circuit by bonding with conductive adhesives (for example adhesives loaded with conductive particles such as silver, copper or carbon particles) and/or by welding, for example with tin or its alloys (for example tin-bismuth).

Preferably one or more of said at least one sensor, said processing unit and said transceiver is a pre-fabricated electronic component. This pre-fabricated electronic component can be (directly) fixed, and electronically connected, to the electric connection circuit, for example by bonding with conductive adhesives and/or welding. In one embodiment one or more of said at least one sensor, said processing unit and said transceiver is directly made in situ onto the flexible support (i.e. it is not pre-fabricated), for example by printing or deposition technologies.

Preferably at least two among said sensor, said processing unit and said transceiver, more preferably all three, are arranged in a single assembly, preferably pre-fabricated (for example by means of a containment body which houses at least partially said at least two among said sensor, said processing unit and said transceiver). In this way the realization of the monitoring device is significantly simplified.

DETAILED DESCRIPTION OF SOME EMBODIMENTS OF THE PRESENT INVENTION

The characteristics and advantages of the present invention will be further clarified by the following detailed description of some embodiments, presented by way of non-limiting example of the present invention, with reference to the attached figures.

Figure 1:
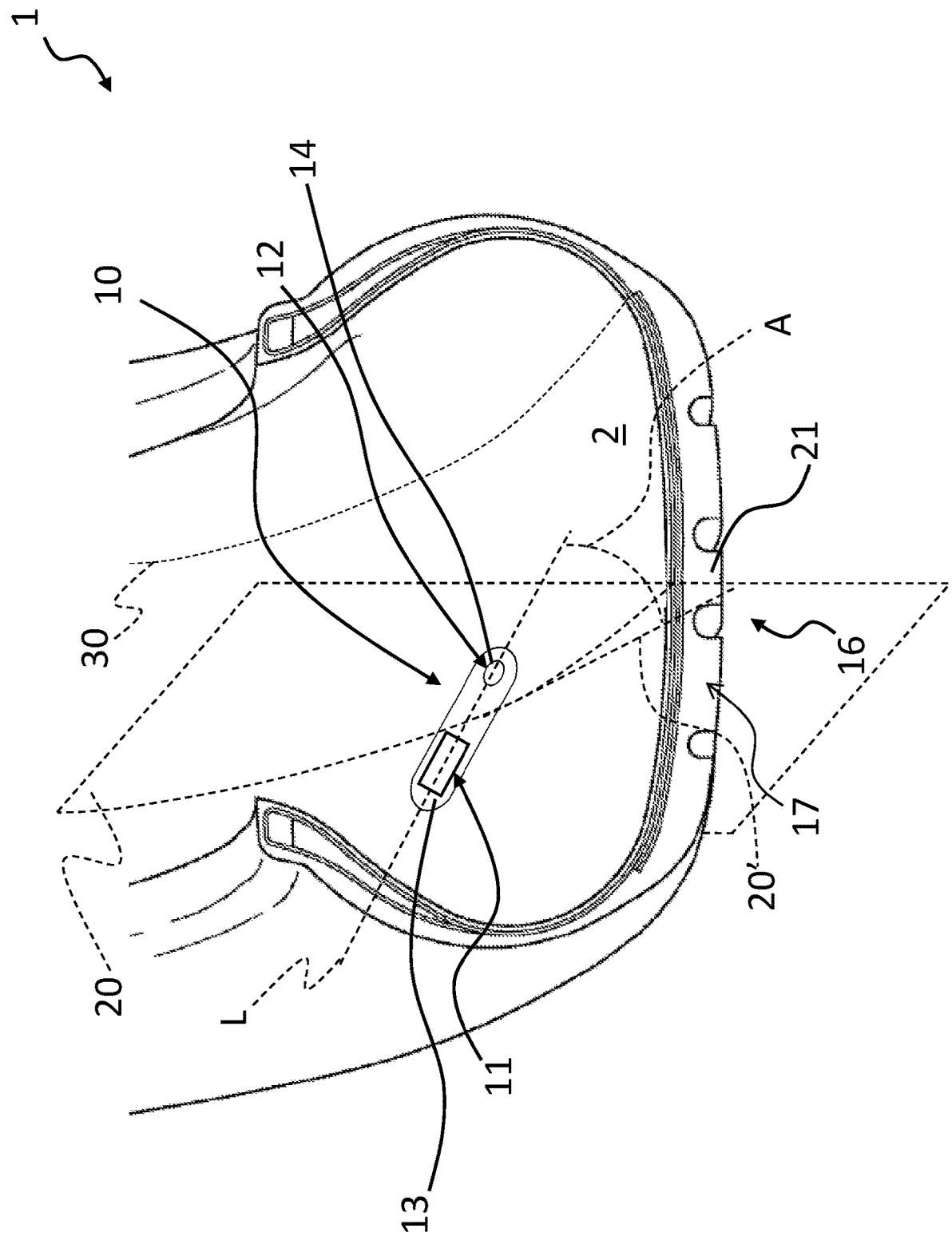
FIG. 1 shows a schematic, perspective and partial view of a section of tyre comprising a monitoring device according to the present invention.

In FIG. 1 with the reference number 1 it is shown a tyre (in partial perspective section) comprising a monitoring device 10 according to the present invention. The dashed lines 30 indicate in a schematic and arbitrary manner the boundary lines between the crown portion 16 and the shoulders of the tyre. In the present description and figures the same reference number is used for the same elements, also in their embodiments.

Figure 2:
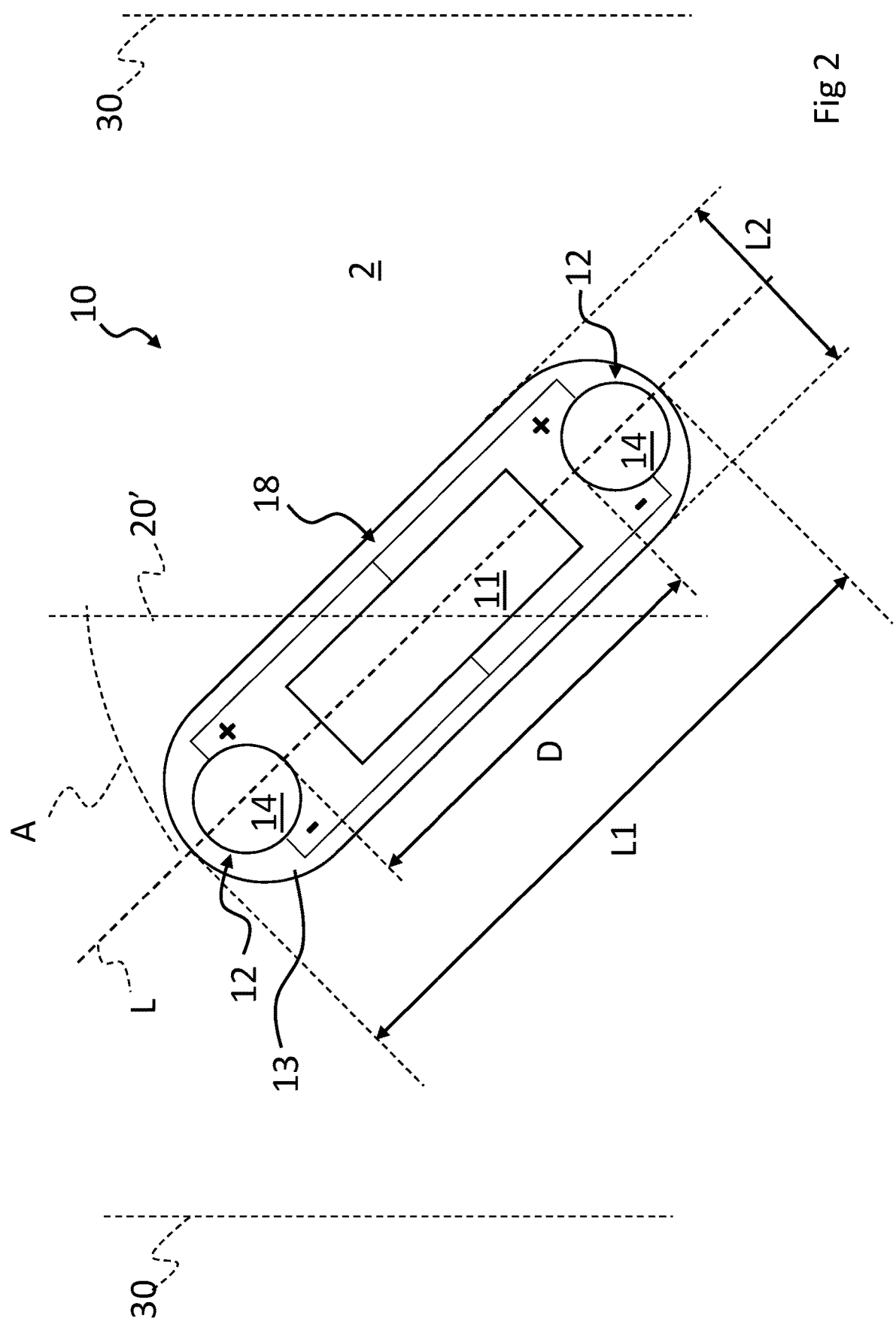
FIGS. 2-3 show a schematic, perspective and partial plan view of the inner surface of the tyre developed on the plane of the figure and comprising further of respective embodiments of the monitoring device according to the present invention
Figure 3:
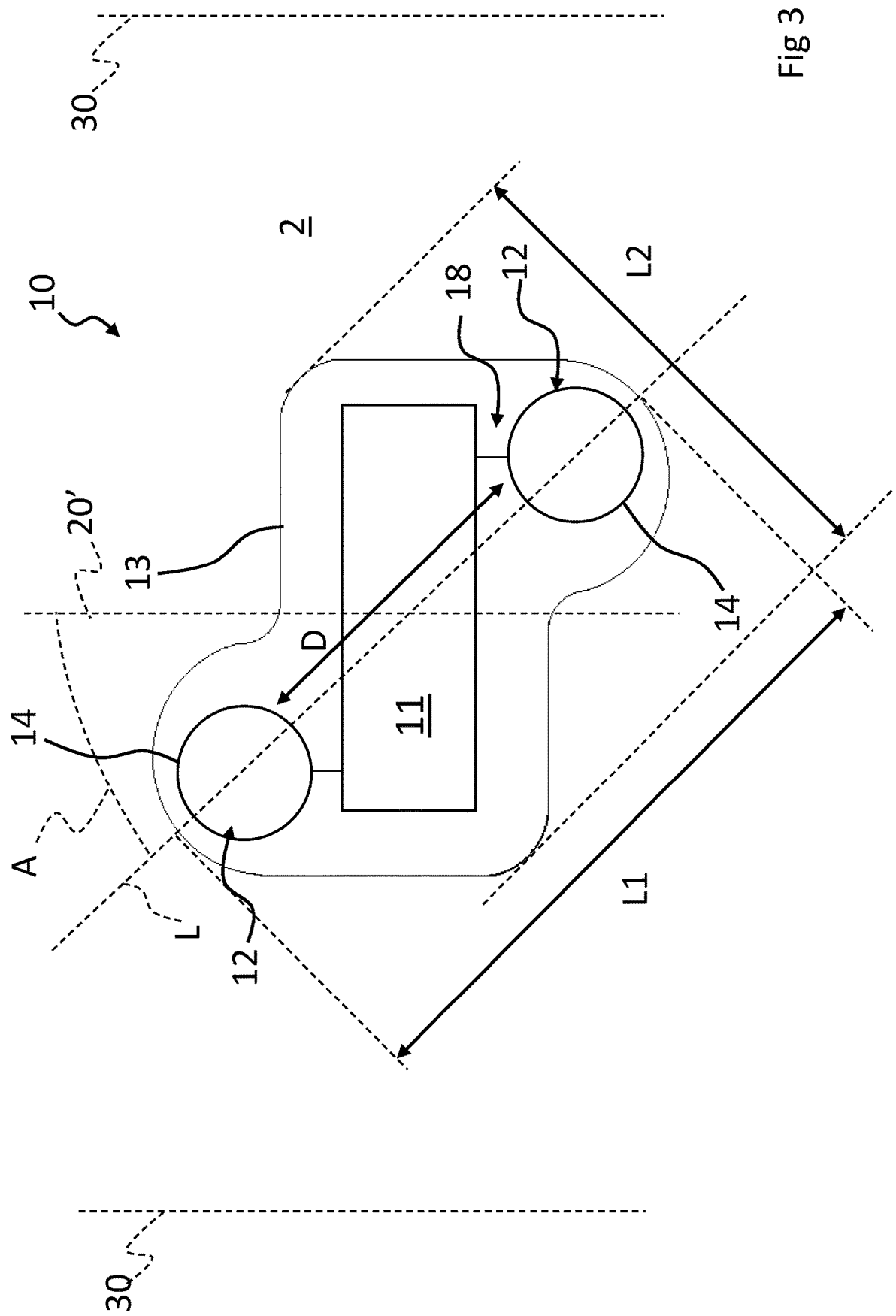

In FIGS. 2 and 3 it is shown a plan view of a portion of inner surface 2 of the crown portion schematically delimited by the directions 30, developed on the laying plane of the figure together with the monitoring device 10. With the number 20' it is shown the direction of intersection of the equatorial plane 20 with the inner surface 2 of the tyre (developed in plane) near to the monitoring device. All the figures are shown not in scale, for illustrative purposes only.

The monitoring device 10 comprises an electronic unit 11 and an electric power supplier 12 electrically connected to the electronic unit.

The monitoring device 10 further comprises a flexible support 13 in a single body, fixed onto the inner surface 2 of the tyre at a crown portion 16 of the tyre 1 (i.e. the portion of tyre at the tread band 17). The electronic unit and the electric power supplier are fixed onto the flexible support 13, for example by means of conductive adhesive (e.g. Henkel® 3104 WXL) and of structural adhesive (e.g. Henkel® LOC-TITE® 312™).

Preferably the electric power supplier 12 comprises an electrical energy accumulator 14 (for example only one as shown in FIG. 1), more preferably, as exemplarily shown in FIGS. 2 and 3, a plurality of distinct electrical energy accumulators 14, each accumulator 14 being electrically connected to the electronic unit for supplying the electronic unit. Each accumulator 14 is directly fixed onto the flexible support 13. Exemplarily each accumulator 14 is an electric battery, for example a coin cell battery of the type CR2032HR sold by Maxell® (capacity 200 mAh, weight 3 g, diameter and thickness 20×3.2 mm), or BR1632A sold by Panasonic® (capacity 120 mAh, 1.5 g, 6×3.2 mm). The typical voltage is equal to 3V, and the operating temperature range from −40° C. to +125° C. (or possibly in sub-intervals, depending on the type of envisaged use).

The monitoring device 10 comprises an electric connection circuit 18 (shown only schematically in the FIGS. 2 and 3) for connecting each accumulator 14 to the electronic unit 11. In the case of a plurality of accumulators, preferably they are connected in parallel (as exemplarily and schematically shown only in the FIG. 2).

In one embodiment, the tracks of the electric connection circuit are made with a conductive ink (e.g. silver conductive ink DuPont® 5025) directly printed on the flexible substrate, for example with serigraphic technique.

The electronic unit 11 comprises (not shown) at least one sensor for detecting at least one of the following physical quantities: temperature, pressure, acceleration; a processing unit and a transceiver.

As an example, the electronic unit can include a prefabricated assembly model FXTH870911DT1 sold by NXP Semiconductors®, comprising a processing unit and a plurality of sensors suitable for detecting all the three physical quantities: temperature, pressure and acceleration. This assembly also includes an RF transceiver with a transceiver frequency of 315-434 Mhz. In an exemplary embodiment, it can be used a further transceiver fixed to the flexible separately from the aforementioned assembly, usable on a different frequency band (for example with Wifi or Bluetooth® technology).

Exemplarily the flexible support 13 is a film made of polyimide (e.g. Kapton® by DuPont®).

A layer of adhesive (not shown), for example pressure sensitive, may be arranged to bond the lower face of the flexible support 13 to the inner surface of the tyre.

Preferably the device 10 is applied to the inner surface of the tyre in such a way that the equatorial plane 20 of the tyre crosses the monitoring device 10 (for example in FIG. 1 in intermediate position between the power supplier and the electronic unit), more preferably, as exemplarily shown in FIGS. 2 and 3, it crosses the electronic unit 11 (for example so that the sensor is located at or near to the central rib 21 of the tread 17).

In some embodiments, the plurality of accumulators 14 comprises two and no more than two accumulators, more preferably arranged on opposite parts of the electronic unit 11, as exemplarily shown in the FIGS. 2 and 3.

The flexible support 13 has a plan with an elongated shape along a main development direction L.

Preferably (FIGS. 1, 2 and 3) the electric power supplier 12 (more preferably said accumulator/s 14) and the electronic unit 11 are arranged along the main development direction L (for example the main development direction passes through the respective centres of mass of the electronic unit and of the power supplier).

Preferably (FIGS. 2 and 3) the accumulators 14 are arranged along the main development direction L (for example the main development direction passes through the respective centres of mass of each accumulator).

Preferably the two accumulators 14 are arranged at longitudinally opposite ends of the monitoring device (FIGS. 2 and 3).

According to an aspect of the invention, and as schematically shown in the figures, the monitoring device 10 has plan dimensions L1 and L2 (respectively along such direction L and along its perpendicular direction) different to each other.

Exemplarily, in the case of the device of FIG. 2, the dimensions L1×L2 are equal to about 110×30 mm (aspect ratio R equal to 3.7) or about 80×25 mm (R equal to 3.2).

Exemplary the distance D between the two accumulators is equal to about 69 mm in the case of the dimensions 110×30 mm, while for dimensions equal to 80×25 mm the distance D is equal to about 50 mm.

Exemplarily, in the case of the device of FIG. 3, the dimensions L1×L2 are equal to about 80×55 mm (aspect ratio R equal to about 1.5) and the distance D between the two accumulators is equal to about 45 mm.

According to the present invention, as shown exemplarily in the figures, the monitoring device is fixed onto the inner surface of the tyre 1 so as to form an acute angle A between the main development direction L and the direction of intersection 20' greater than or equal to at 20° (preferably greater than or equal to 25°, more preferably greater than or equal to 30°) and lower than or equal to 70° (preferably lower than or equal to 65°, more preferably lower than or equal to 60°). For example, this acute angle A can be equal to 45°.

The invention claimed is:

1. A tyre comprising a monitoring device fixed on an inner surface of the tyre at a crown portion of the tyre,
   wherein the monitoring device comprises an electronic unit and an electric power supplier for supplying the electronic unit,
   wherein the electronic unit comprises: at least one sensor for detecting at least one of the following physical quantities: temperature, pressure, acceleration, and deformation; a processing unit; and a transceiver,
   wherein the monitoring device further comprises a flexible support in a single body having a plan with an elongated shape along a main development direction (L), the electronic unit and the electric energy supplier are fixed to the flexible support, and
   wherein an acute angle (A) formed between the main development direction (L) and a direction of intersection of an equatorial plane of the tyre with the inner surface of the tyre is greater than or equal to 20° and lower than or equal to 70°.

2. The tyre according to claim 1, wherein the acute angle is greater than or equal to 25°, and lower than or equal to 65°.

3. The tyre according to claim 1, wherein the acute angle is greater than or equal to 30°, and lower than or equal to 60°.

4. The tyre according to claim 1, wherein a length of the flexible support along the main development direction (L) is greater than or equal to 70 mm, and lower than or equal to 140 mm.

5. The tyre according to claim 1, wherein an aspect ratio (R) between a length (L1) of the flexible support along the main development direction (L) and a width (L2) along a direction perpendicular to the main development direction (L) is greater than or equal to 1.5, and lower than or equal to 6.

6. The tyre according to claim 1, wherein the electric power supplier and the electronic unit are arranged along the main development direction (L).

7. The tyre according to claim 1, wherein the electric power supplier comprises a plurality of electric energy accumulators, each accumulator is electrically connected to the electronic unit and suitable for supplying the electronic unit; each of the accumulators is fixed on the flexible support; the accumulators are arranged along the main development direction (L); and the accumulators are electrically connected to the electronic unit in parallel.

8. The tyre according to claim 7, wherein the plurality of accumulators comprises a first and a second accumulator arranged at opposite sides of the electronic unit; the plurality of accumulators comprises two and no more than two accumulators; and the first and second accumulators are arranged at longitudinally opposite ends of the monitoring device.

9. The tyre according to claim 7, wherein a distance (D) between each pair of accumulators is greater than or equal to 40 mm, and lower than or equal to 250 mm.

10. The tyre according to claim 1, wherein the monitoring device further comprises an electric connection circuit for connecting the electric power supplier to the electronic unit; the electric connection circuit comprises at least two separate electric paths; and the electric connection circuit is printed onto the flexible support with a conductive ink or the electric connection circuit comprises copper conducting tracks chemically etched with a thin layer of copper.

11. The tyre according to claim 1, wherein the equatorial plane of the tyre crosses the monitoring device.

12. The tyre according to claim 1, wherein the at least one sensor detects two or more of the following physical quantities: temperature, pressure, deformation, and acceleration.

13. The tyre according to claim 1, wherein the flexible support is non extensible support and fixed to the inner surface of the tyre by a layer of adhesive.

14. The tyre according to claim 1, wherein the flexible support is a film of an elastomeric or thermoplastic material chosen from nylon, polyethylene terephthalate (PET), polyethylenenaphthalate (PEN), polyimide, ethylene propylene diene monomer rubber (EPDM), diene polymers and polyurethane resins, or the flexible support is chosen from paper substrates, thin epoxy resin layers, and thin semiconductor layers.

15. The tyre according to claim 1, wherein one or more of the at least one sensor, the processing unit, and the transceiver is a pre-fabricated electronic component fixed, and electrically connected, to the electric connection circuit by gluing with conductive adhesives or by welding.

* * * * *